T. W. FOSTER.
WATCH FOB.
APPLICATION FILED SEPT. 16, 1911.
1,032,328.
Patented July 9, 1912.
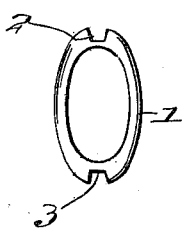
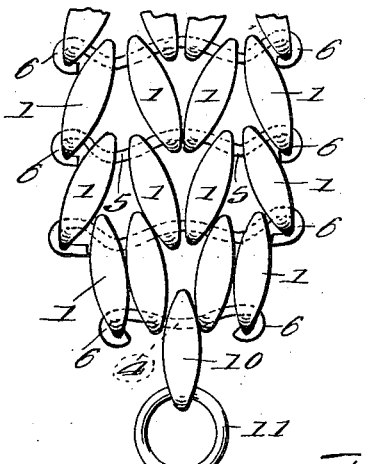

UNITED STATES PATENT OFFICE.

THEODORE W. FOSTER, OF PROVIDENCE, RHODE ISLAND.

WATCH-FOB.

1,032,328.  Specification of Letters Patent.  Patented July 9, 1912.

Application filed September 16, 1911. Serial No. 649,770.

*To all whom it may concern:*

Be it known that I, THEODORE W. FOSTER, a citizen of the United States, residing at Providence, in the county of Providence and State of Rhode Island, have invented a new and useful Improvement in Watch-Fobs, of which the following is a specification.

This invention relates to certain new and useful improvements in watch fobs and the invention resides more particularly in the manner of connecting the links of the fob together so as to form a unitary structure.

The object of the invention is to provide a watch fob which has novel, simple, inexpensive and efficient means for connecting the links so that the latter present an artistic and attractive appearance.

Further and other objects will later appear.

In the drawings: Figure 1 is a front elevation partly broken away of a fob constructed in accordance with the present invention. Fig. 2 is a side elevation of one of the links. Fig. 3 is a side view of one of the connecting rods, and Fig. 4 is an end view thereof.

Proceeding in accordance with the present invention some of the links 1 are preferably formed with top slots 2 and bottom slots 3, located at opposite ends of the links and formed in the manner shown in Fig. 2 of the drawings. The connecting rods have a central upwardly curved portion 4 at the ends of which are concave portions 5, the extremities of the concave portions 5 being formed with hook-shaped portions 6. The ends of the hooks 6 are of a width so as to be received in the slots 2 and 3 of the links 1.

By referring to Fig. 1 of the drawings, it will be seen that the top rod or bar is passed through a top link 7 so that the curved portion 4 of the rod or bar seats on the bottom end of the link 7. A hook 8 is connected by means of a series of links 9 with the uppermost link 7. The hooked portions 6 are, as shown in Fig. 1 of the drawings, bent to engage about and to seat in the slots 2 of the upper ends of the outer links 1, of the uppermost series of links, said outer links having their lower ends spread apart or divergently related and being held in such position by the hooked ends 6 of the next adjacent rod or bar engaging through said lower ends of the links 1 and having their ends extending in the slots 3 thereof. It will be noted that the outermost rods or bars are of less length than the intermediate rods or bars, the outer and lowermost links of the last series of links as shown in Fig. 1 having their lower ends convergently related and secured to a rod or bar that is reversely disposed as compared with the uppermost rod or bar, in a manner above described, which rod or bar has a single lower link 10 connected thereto, the link 10 receiving a ring 11 to which a charm may be attached. Each series of links contains four links, the outer ones of the uppermost series of which have the ends of the inwardly bent hooks 6 of the adjacent rods or bars received in the slots 3, and the innermost links have their upper ends engaged on opposite sides of the curved portions 4 of the rods or bars adjacent the concave parts 5 thereof. The inner pair of links of a lower series of links engage on opposite sides of the lower ends of an upper pair of inner links.

It will be seen that the rods or bars are transversely arranged in spaced relation so that the links are connected at their ends to each of the adjacent bars, and the links have their ends in close proximity to each other so as to be capable of engagement with each other.

It will be observed from the above that the rods have a transverse disposition, and that the links which bridge the space therebetween are arranged in vertical rows, the several links of the rows having diverse inclinations, the links being so arranged that the rods are held in spaced relation as depicted in Fig. 1 of the drawings, wherein it will be noted that the upper ends of the links are virtually wedged in the space between the lower ends of the next adjacent links, and thereby restrict the extent of movement which the rods may have toward each other.

The outer links of the uppermost series of links receive and have a rigid connection with the uppermost pair of rods or bars, the hooks 6 of which latter have their ends received in the slots 2 and 3 of the links, as depicted in Fig. 1, of the drawings. The outer links of the remaining series of links receive the rods or bars and have bottom slots 3 in which the inwardly bent hooks 6 are received. All of the remaining links of each series are loosely threaded on the rods or bars having slight movement thereon.

Having thus described my invention, I claim as new and desire to secure by Letters Patent:

1. A watch fob including a series of spaced rods, each rod having a convex central portion and a concave portion on each side of the convex portion, a pair of inner links for each pair of rods through which the rods pass, the links being disposed adjacent the convex portions of the rods, a pair of outer links for each pair of rods through which outer links the rods pass, the lower rod of the pairs of rods having its ends formed with hooks to engage said outer links, a link connected to the uppermost rod and engaging the convex part thereof and being disposed between the outer ends of the inner pair of links of said uppermost rod, and a single link connected to the lowermost bar engaging the convex portion thereof and disposed between the outer ends of the inner pair of links of the lowermost bar.

2. A watch fob including a series of transverse spaced rods, an inner and an outer pair of links for each pair of rods, the lower ends of an upper pair of inner links being located between the upper ends of a next lower pair of inner links, and means to secure the rods to the outer pairs of links.

3. A watch fob including a series of links arranged in rows, the links of said rows having diverse inclinations.

4. A watch fob including spaced transverse rods, and links strung on the rods, said rods having hook-shaped ends to engage the outer of the links.

5. A watch fob including a series of pairs of spaced transverse rods, links having slots at their ends, and hooks on the rods bent to engage in said slots.

6. A watch fob including spaced transverse rods, a series of links connecting each pair of the rods, the lower ends of the outer links of each series being rigidly secured to an adjacent rod, the upper ends of the inner links of each series of links being arranged to have their ends disposed adjacent the ends of said outer links so as to be capable of contact therewith.

7. A watch fob including pairs of spaced rods and a series of links for each pair of rods through which the rods are passed, the rods having hook-shaped ends which are engaged with the lower ends of the outer links of each series of links, the upper ends of said outer links abutting the lower end of the next adjacent outer links.

8. A watch fob including spaced rods, and a series of links connecting each pair of rods, the outer links of each series being bodily inclined toward each other at their upper ends, and the intermediate links of said series being inclined toward each other at their lower ends.

9. A watch fob including spaced rods, and a series of links connecting each pair of rods, said links being arranged so that the lower ends of the intermediate links of a series of links are disposed between the upper ends of the intermediate links of the next adjacent series of links.

10. A watch fob including spaced rods, and a series of links connecting each pair of rods, said links being arranged so that the lower ends of the intermediate links of a series of links are disposed between the upper ends of the intermediate links of the next adjacent series of links, and the upper ends of the outer links of said next adjacent series of links are disposed between the lower ends of the outer links of said first mentioned series of links and the upper ends of the intermediate links of said next adjacent series of links.

11. A watch fob including spaced rods, a pair of outer links connecting each pair of rods, and having their lower ends rigidly connected to the ends of the lower rod of a pair of rods and other links connected to the rods and located between the outer links and arranged so that the lower ends of the inner links of an upper series of links are located between the upper ends of the inner links of the next adjacent series of links.

In testimony whereof I have signed my name to this specification in the presence of two subscribing witnesses.

THEODORE W. FOSTER.

Witnesses:
ADA E. HAGERTY,
J. A. MILLER.

Copies of this patent may be obtained for five cents each, by addressing the "Commissioner of Patents, Washington, D. C."